(No Model.)
G. BANKS.
SEAT FOR AGRICULTURAL MACHINES.
No. 420,430. Patented Feb. 4, 1890.
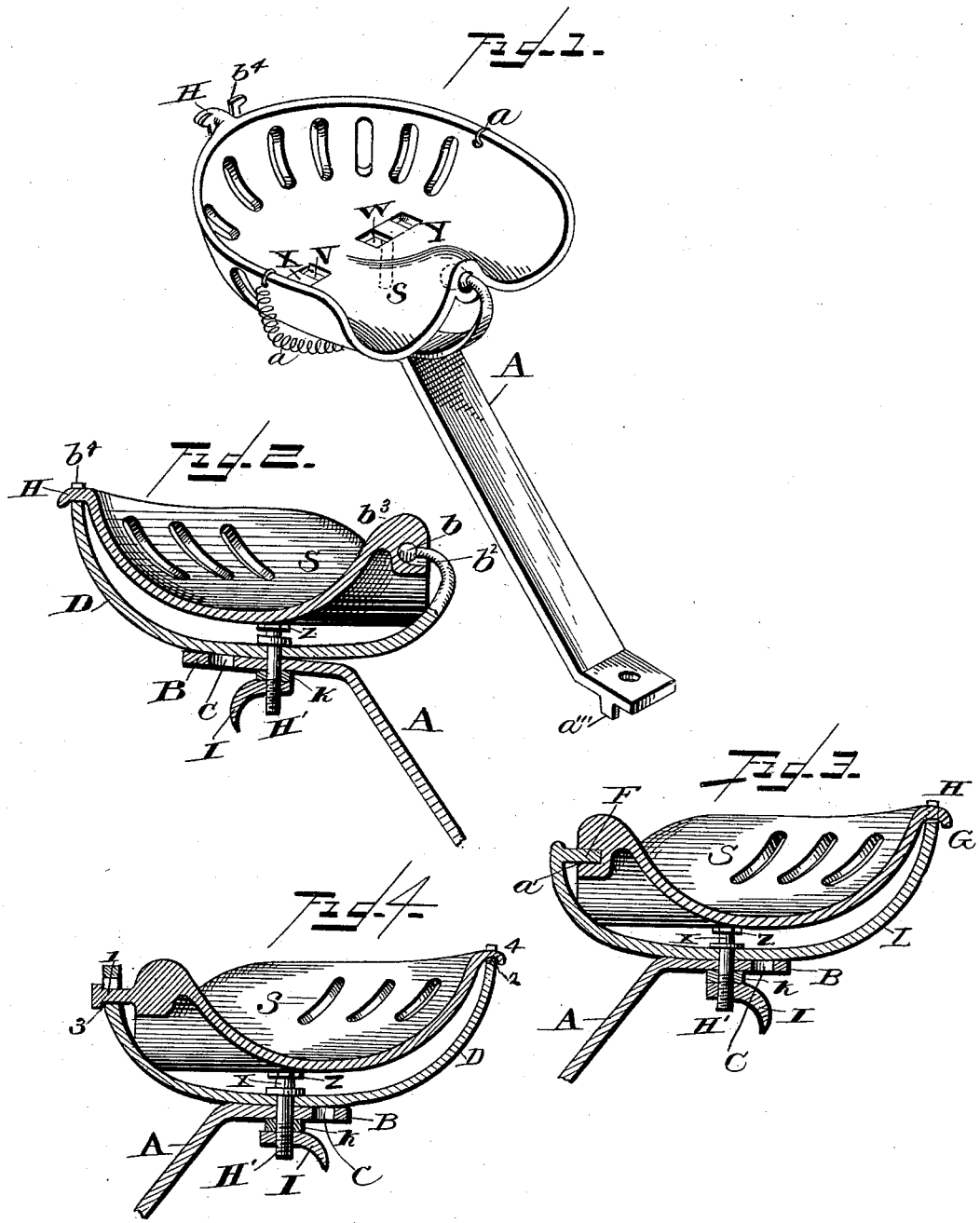
WITNESSES
F. L. Ourand
Wm F. Folks
INVENTOR
George Banks
by James Dagger & Co,
Attorneys.

UNITED STATES PATENT OFFICE.

GEORGE BANKS, OF OAKFIELD, MICHIGAN.

SEAT FOR AGRICULTURAL MACHINES.

SPECIFICATION forming part of Letters Patent No. 420,430, dated February 4, 1890.

Application filed February 15, 1889. Serial No. 299,959. (No model.)

*To all whom it may concern:*

Be it known that I, GEORGE BANKS, a citizen of the United States, and a resident of Oakfield, in the county of Kent and State of Michigan, have invented certain new and useful Improvements in Seats for Agricultural Machines; and I do hereby declare that the following is a full, clear, and exact description of the invention, which will enable others skilled in the art to which it appertains to make and use the same.

This invention relates to seats for agricultural machines, and is designed as an improvement on the seat patented to me under date of February 1, 1887, bearing the number 357,059; and it consists in the construction and novel combination of parts, as will be hereinafter fully described, and particularly pointed out in the claims.

In the drawings, Figure 1 is a view in perspective of a seat designed for use in connection with agricultural implements of the riding-class embodying the improvements of my invention. Fig. 2 is a vertical longitudinal sectional view of the same. Fig. 3 is a longitudinal vertical sectional view of the invention in a modified form; and Fig. 4 is a longitudinal vertical section of another modified form of the seat, its support, and fastening.

Referring by letter to the accompanying drawings, A designates the seat-support, which is securely bolted to a suitable crosspiece of the frame of the machine and extends rearwardly and upwardly in an inclined position, and is provided at its upper end with a perforated rearward extension B, two perforations or bolt-holes C being usually employed to secure the yoke or bow D in one of the two positions, so that the weight of the driver may be shifted forward and backward to adapt the machine more readily to heavy and light persons who may be engaged at different times as drivers of the agricultural implement to which the seat may be applied.

The extension B of the inclined seat-support A is in Figs. 1 and 2 inclined slightly upward, while in Figs. 3 and 4 said extension is horizontal, or substantially so, and on this extension B is supported the yoke D. The front part of the yoke D is extended forwardly, upwardly, and then rearwardly to form a trunnion to support the front end of the seat, and is provided at its extremity with a slight knob or ball $b$, which is to be slipped in a hole or seat $b^2$ in the front end of the middle projection $b^3$ of the seat proper. The rear end of the yoke is provided with a fork $b^4$, or is bifurcated. At its rear end, which is preferably higher than its front end, the seat is provided with a rearwardly-projecting trunnion H, which is preferably nearly hook-shaped and is dropped into the fork or bearing $b^4$ at the rear upper end of the yoke and holds the seat secure, and the front end is held in place from slipping by the knob, which enters the hole $b^2$ at the front end of the seat proper.

In another form (shown in Figs. 3 and 4 of the drawings) the rearward extension B is nearly if not quite horizontal.

The yoke D is preferably made of metal, and in Fig. 3 is provided at its front end with a rearwardly-projecting trunnion F, which enters a bearing or seat $a'$ in the front elevated middle portion of the seat, the same being slipped to place, and at its rear end its rear trunnion H is nearly in hook shape and is dropped in place in the fork G in the rear end of the yoke.

The yoke D is secured to the seat-support by a bolt H', lever-nut I, and washer K. The seat S is of cast metal, preferably, but may be made of other suitable material and of the pattern usually employed in this class of agricultural implements. It is shaped to conveniently fit the legs of the driver as he would naturally sit to overcome the motion given to the moving machine as it passes over the rough ground, his legs being spread apart to balance himself and give him the necessary control of the team. In addition to the openwork form commonly employed in this class of seats, the bottom of the seat is provided with two transverse slots or openings V W, in which are secured bolts or rods X Y, nuts Z, bearing against the under side of the bottom of the seat, being employed to hold said rods or bolts to their adjustment. The bolts X Y are headed and the heads thereof are arranged in the recesses V and W of the seat and are retained in their adjusted position by means of nuts Z, which are screwed on the bolts and normally rest against the under side of the seat, and the lower ends of the bolt are adapted to contact with the extension of the seat-supporting bar, and thereby limit the tilt of the seat, as will be readily understood. These bolts or rods project below the bottom of the seat and also below the yoke. In addition to these adjustable bolts or rods two laterally-extending coiled-spring wires $a\ a$, which may or may not be employed, as may be preferred, are secured to the upper edges of the seat at opposite sides thereof in line with the adjustable bolts, and serve to steady the seat so that it will not swing too loosely on its trunnions, said wires being connected at one end to the seat and at the other end to the yoke.

The seat is slipped to place from the rear side of the yoke, and its rear trunnion is afterward tied or secured in place in the fork of the yoke.

The seat-support is preferably provided at its lower end with a lip, flange, or rib $a'''$ on its under side to prevent it from turning. The rear trunnion is preferably hook shape or notched on its under side to prevent it from sliding forward, and the front trunnion is provided with the ball for a similar purpose, so that great security is attained.

The preferred form of the yoke, and the one which I preferably use, is shown in Fig. 4, and is constructed as follows: It is nearly U shape in outline, the rear arm of the yoke being slightly the longer. The front portion of the yoke is provided with a bearing 3, while the rear portion of the yoke is provided in its rear end with a fork 2. The seat, provided with a trunnion on its front, is slipped to place from the rear, the trunnion 1 entering a hole or bearing 3 in the yoke, the rear hook-trunnion 4 entering the fork 2 in the rear portion of the yoke. This hook-trunnion 4 may be tied in with wire also, if preferred, to hold the trunnion in place.

Having thus fully described my invention, what I claim, and desire to secure by Letters Patent, is—

1. The combination, with a seat having a trunnion at the rear and an opening in its front end, of a yoke having a bearing at its rear end for the trunnion of the seat and the front end bearing in the opening of the seat, substantially as and for the purpose described.

2. The combination, with a seat having a trunnion at its rear end and a hole or bearing in its front end, of the yoke having a fork at its rear end, in which the trunnion of the seat bears, and a trunnion at its front end bearing in the hole or bearing in the front end of the seat, substantially as and for the purpose described.

3. The combination, with a support having front and rear bearings and a rocking seat pivoted thereon, having transverse slots in the bottom, of adjustable bolts having their heads secured in the slots to form stops for limiting the rocking movement of the seat, substantially as described.

4. The combination of a support having front and rear bearings, the tilting seat pivoted thereon and having transverse slots in the bottom thereof, the adjustable bolts having the heads secured in the slots and forming stops for limiting the movement of the seat, and the nuts on the bolts for retaining them in their proper adjustment, substantially as described.

In testimony that I claim the foregoing as my own I have hereunto affixed my signature in presence of two witnesses.

GEORGE BANKS.

Witnesses:
  CARY VINING,
  PETER PETERSON.